US010411967B2

(12) United States Patent
Krishnaswamy et al.

(10) Patent No.: US 10,411,967 B2
(45) Date of Patent: Sep. 10, 2019

(54) APPARATUS, METHOD, AND MANUFACTURE FOR CLOUD NETWORK UPDATING

(71) Applicant: Microsoft Technology Licensing, LLC, Redmond, WA (US)

(72) Inventors: Umesh Krishnaswamy, San Jose, CA (US); Nikolaj Bjorner, Woodinville, WA (US); Muntazir Mehdi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 336 days.

(21) Appl. No.: 15/292,902

(22) Filed: Oct. 13, 2016

(65) Prior Publication Data

US 2018/0109424 A1 Apr. 19, 2018

(51) Int. Cl.

*H04L 12/24* (2006.01)
*H04L 12/751* (2013.01)
*H04L 12/911* (2013.01)

(52) U.S. Cl.

CPC ............ *H04L 41/12* (2013.01); *H04L 41/145* (2013.01); *H04L 41/147* (2013.01); *H04L 45/02* (2013.01); *H04L 47/781* (2013.01)

(58) Field of Classification Search

CPC ..... H04L 41/12; H04L 41/147; H04L 41/145; H04L 45/02

See application file for complete search history.

(56) References Cited

U.S. PATENT DOCUMENTS 8,422,379 B2 4/2013 Xu et al.
8,867,333 B2 10/2014 Doshi et al.
2006/0050634 A1 3/2006 Gous
2009/0141636 A1 6/2009 Dolganow
2012/0076014 A1 3/2012 Bragg
2012/0182865 A1* 7/2012 Andersen .................. H04L 1/22 370/228
2015/0003283 A1 1/2015 Previdi et al.
2015/0103844 A1 4/2015 Zhao et al.
2015/0117203 A1* 4/2015 Filsfils .................. H04L 47/122 370/235

(Continued)

OTHER PUBLICATIONS

Seok, et al., "Dynamic Constrained Multipath Routing for MPLS Networks", In Proceedings of Tenth International Conference on Computer Communications and Networks, Oct. 15, 2001, pp. 348-353.

(Continued)

*Primary Examiner* — Michael A Keller
(74) *Attorney, Agent, or Firm* — Davin Chin; Chin IP, PLLC

(57) ABSTRACT

The present technology is generally directed to updating a cloud network. This technology may include generating a set is inequalities based network topology information, shared risk link group information, demand information, and traffic solver parameters. The set of inequalities may also be based upon a model of traffic routing that is based on selection of routes based on dynamic and global traffic engineering. A capacity plan may also be generated based on the set of inequalities and at least one objective. The capacity plan may include a target capacity for each link of the plurality of links in the network.

20 Claims, 4 Drawing Sheets

490
Start
Receive topology information 491
Receive SRLG Information 492
Receive demand information 493
Receive traffic solver parameters 494
Generate set of inequalities based on received information 495
Generate capacity plan based on objective(s) and the set of inequalities 496
Update network based on the capacity plan 497
Return

(56) References Cited

U.S. PATENT DOCUMENTS

2015/0222557 A1 8/2015 Bhattacharya
2017/0353244 A1* 12/2017 Takeshita .............. H04L 12/437

OTHER PUBLICATIONS

Lagoa, et al., "Adaptive Control Algorithms for Decentralized Optimal Traffic Engineering in the Internet", In Proceedings of IEEE/ACM Transactions on Networking, vol. 12, No. 3, Jun. 2004, pp. 415-428.

* cited by examiner

APPARATUS, METHOD, AND MANUFACTURE FOR CLOUD NETWORK UPDATING

BACKGROUND

Traffic routing in computer networks is generally subject to several constraints, such as the available capacity of links connecting network nodes. Packets may traverse designated routes in a network between an origin and destination point. Managing the traffic flow in these networks may involve optimizing the selection of routes for the traffic for the purpose of minimizing congestion and packet loss.

Current industry practice related to routing optimization typically involves selecting the shortest path first (SPF) between each origin and destination node, for example, based on a set of optimized link metrics or link weights. Dealing with unforeseen network events is often done by greatly increased provisioning in the capacity planning process in order to protect against bottlenecks that may occur.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

Figure 1:
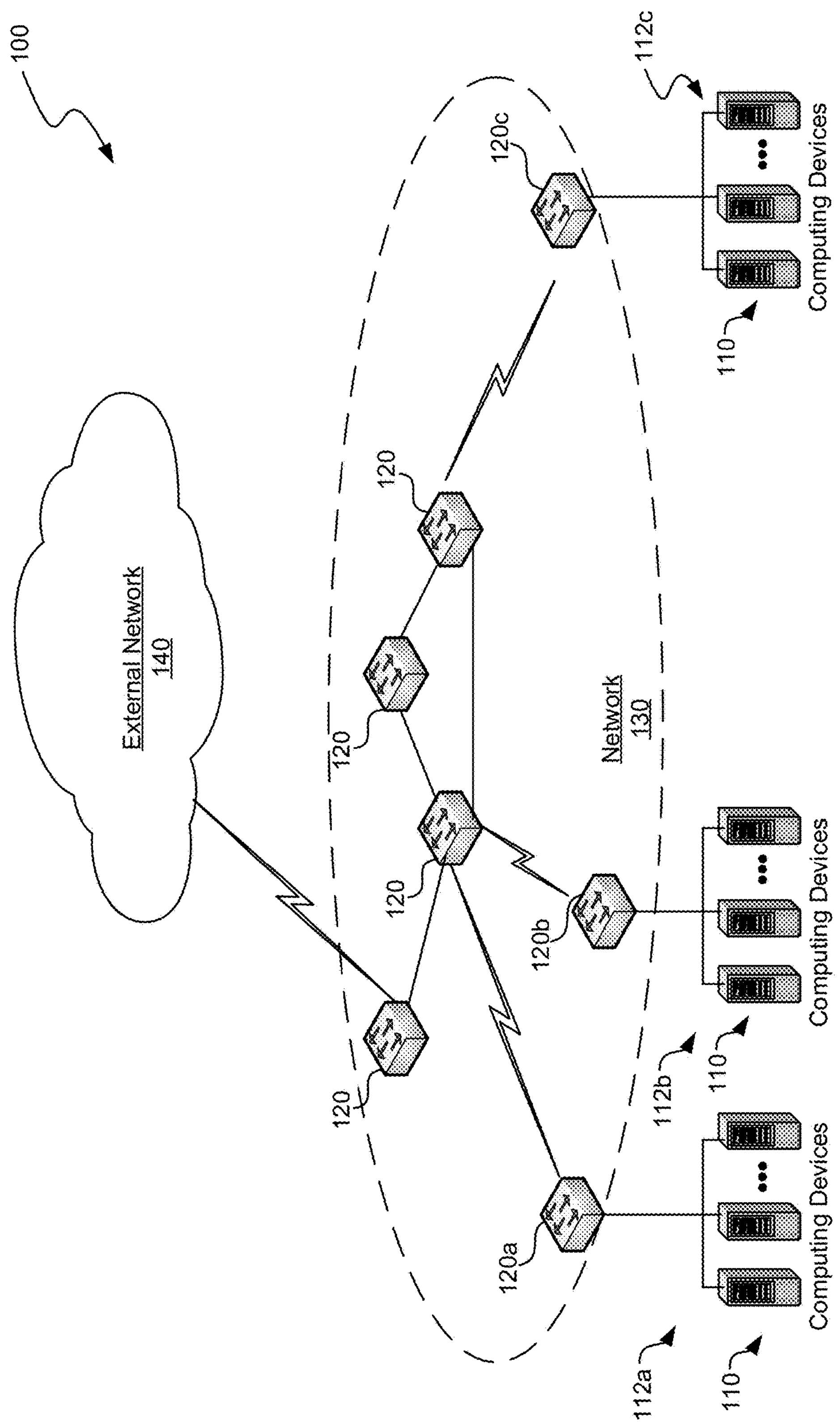
FIG. 1 is a block diagram illustrating one example of a suitable environment in which aspects of the technology may be employed.

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on", and includes the option of being based on additional factors, some of which may not be described herein. As another example, the term "via" is not exclusive, and is equivalent to the term "via, at least in part", and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Accordingly, for example, a system or component may be a process, a process executing on a computing device, the computing device, or a portion thereof.

Introduction

Briefly stated, the present technology is generally directed to updating a cloud network. This technology may include generating a set of inequalities based network topology information, shared risk link group information, demand information, and traffic solver parameters. The set of inequalities may also be based upon a model of traffic routing that is based on selection of routes based on dynamic and global traffic engineering. A capacity plan may also be generated based on the set of inequalities and at least one objective. The capacity plan may include a target capacity for each link of the plurality of links in the network. The network may be updated based on the capacity plan. After the updating, each link of the plurality of links in the network may have an updated capacity that corresponds to the target capacity. In this way, at least the capacity of at least one of the links of the plurality of links in the network is increased based on the capacity plan.

In some examples, the present technology may be used to grow a network, such as a global cloud network that links various data centers to one another. In some examples, the network is a software-defined network (SDN). In this and other examples, the present technology may be used to optimize network design and network growth. For example, this technology may be used to build a growing cloud network that is resilient to changes in the presence of dynamic changes in a network, such as outages and fluctuations, and to ensure performance and fault resilience under service level agreement (SLA) requirements, while reducing cost associated with the over-provisioning of links.

Illustrative Devices/Operating Environments

FIG. 1 is a diagram of environment 100 in which aspects of the technology may be practiced. As shown, environment 100 includes computing devices 110, as well as network nodes 120, connected via network 130. Even though particular components of environment 100 are shown in FIG. 1, in other examples, environment 100 can also include additional and/or different components. For example, in certain examples, the environment 100 can also include network storage devices, maintenance managers, and/or other suitable components (not shown).

As shown in FIG. 1, network 130 can include one or more network nodes 120 that interconnect multiple computing devices 110, and connect computing devices 110 to external network 140, e.g., the Internet or an intranet. For example, network nodes 120 may include switches, routers, hubs, network controllers, or other network elements. In certain examples, computing devices 110 can be organized into racks, action zones, groups, sets, or other suitable divisions. For example, in the illustrated example, computing devices 110 are grouped into three host sets identified individually as first, second, and third host sets 112*a*-112*c*. In the illustrated example, each of host sets 112*a*-112*c* is operatively coupled to a corresponding network node 120*a*-120*c*, respectively, which are commonly referred to as "top-of-rack" or "TOR" network nodes. TOR network nodes 120*a*-120*c* can then be operatively coupled to additional network nodes 120 to form a computer network in a hierarchical, flat, mesh, or other suitable types of topology that allows communication between computing devices 110 and external network 140. In other examples, multiple host sets 112*a*-112*c* may share a single network node 120. Computing devices 110 may be virtually any type of general- or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 110 may be individually configured to provide computing, storage, and/or other suitable computing services.

Illustrative Computing Device

Figure 2:
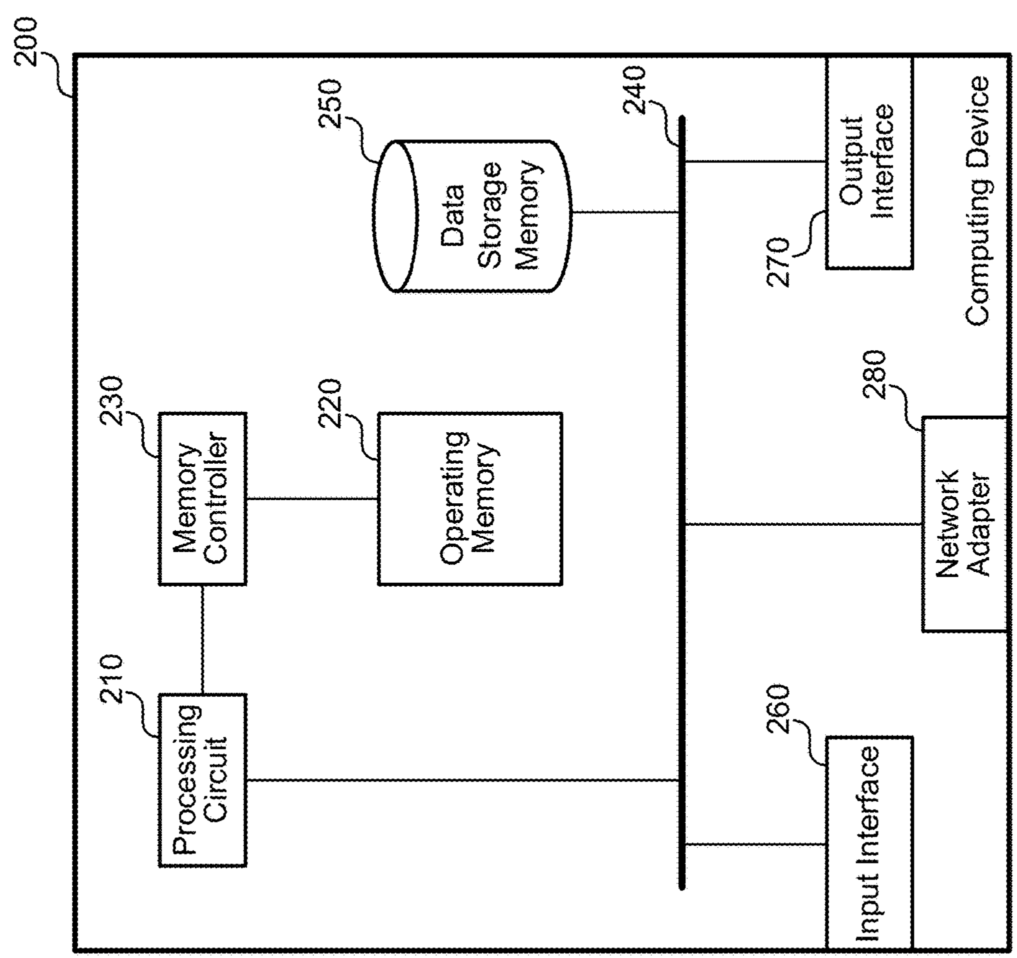
FIG. 2 is a block diagram illustrating one example of a suitable computing device according to aspects of the disclosed technology.

FIG. 2 is a diagram illustrating one example of computing device 200 in which aspects of the technology may be practiced. Computing device 200 may be virtually any type of general- or specific-purpose computing device. For example, computing device 200 may be a user device such as a desktop computer, a laptop computer, a tablet computer, a display device, a camera, a printer, or a smartphone. Likewise, computing device 200 may also be server device such as an application server computer, a virtual computing host computer, or a file server computer, e.g., computing device 200 may be an example of computing device 110 or network node 120 of FIG. 1. Likewise, computer device 200 may be an example any of the devices illustrated in FIG. 5, as discussed in greater detail below. As illustrated in FIG. 2, computing device 200 includes processing circuit 210, operating memory 220, memory controller 230, data storage memory 250, input interface 260, output interface 270, and network adapter 280. Each of these afore-listed components of computing device 200 includes at least one hardware element.

Computing device 200 includes at least one processing circuit 210 configured to execute instructions, such as instructions for implementing the herein-described workloads, processes, or technology. Processing circuit 210 may include a microprocessor, a microcontroller, a graphics processor, a coprocessor, a field programmable gate array, a programmable logic device, a signal processor, or any other circuit suitable for processing data. The aforementioned instructions, along with other data (e.g., datasets, metadata, operating system instructions, etc.), may be stored in operating memory 220 during run-time of computing device 200. Operating memory 220 may also include any of a variety of data storage devices/components, such as volatile memories, semi-volatile memories, random access memories, static memories, caches, buffers, or other media used to store run-time information. In one example, operating memory 220 does not retain information when computing device 200 is powered off. Rather, computing device 200 may be configured to transfer instructions from a non-volatile data storage component (e.g., data storage component 250) to operating memory 220 as part of a booting or other loading process.

Operating memory 220 may include 4$^{th}$ generation double data rate (DDR4) memory, 3$^{rd}$ generation double data rate (DDR3) memory, other dynamic random access memory (DRAM), High Bandwidth Memory (HBM), Hybrid Memory Cube memory, 3D-stacked memory static random access memory (SRAM), or other memory, and such memory may comprise one or more memory circuits integrated onto a DIMM, SIMM, SODIMM, or other packaging. Such operating memory modules or devices may be organized according to channels, ranks, and banks. For example, operating memory devices may be coupled to processing circuit 210 via memory controller 230 in channels. One example of computing device 200 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 220 specifically does not include or encompass communications media, any communications medium, or any signals per se.

Memory controller 230 is configured to interface processing circuit 210 to operating memory 220. For example, memory controller 230 may be configured to interface commands, addresses, and data between operating memory 220 and processing circuit 210. Memory controller 230 may also be configured to abstract or otherwise manage certain aspects of memory management from or for processing circuit 210. Although memory controller 230 is illustrated as single memory controller separate from processing circuit 210, in other examples, multiple memory controllers may be employed, memory controller(s) may be integrated with operating memory 220, or the like. Further, memory controller(s) may be integrated into processing circuit 210. These and other variations are possible.

In computing device 200, data storage memory 250, input interface 260, output interface 270, and network adapter 280 are interfaced to processing circuit 210 by bus 240. Although, FIG. 2 illustrates bus 240 as a single passive bus, other configurations, such as a collection of buses, a collection of point to point links, an input/output controller, a bridge, other interface circuitry, or any collection thereof may also be suitably employed for interfacing data storage memory 250, input interface 260, output interface 270, or network adapter 280 to processing circuit 210.

In computing device 200, data storage memory 250 is employed for long-term non-volatile data storage. Data storage memory 250 may include any of a variety of non-volatile data storage devices/components, such as non-volatile memories, disks, disk drives, hard drives, solid-state drives, or any other media that can be used for the non-volatile storage of information. However, data storage memory 250 specifically does not include or encompass communications media, any communications medium, or any signals per se. In contrast to operating memory 220, data storage memory 250 is employed by computing device 200 for non-volatile long-term data storage, instead of for run-time data storage.

Also, computing device 200 may include or be coupled to any type of processor-readable media such as processor-readable storage media (e.g., operating memory 220 and data storage memory 250) and communication media (e.g., communication signals and radio waves). While the term processor-readable storage media includes operating memory 220 and data storage memory 250, the term "processor-readable storage medium," throughout the specification and the claims whether used in the singular or the plural, is defined herein so that the term "processor-readable storage medium" specifically excludes and does not encompass communications media, any communications medium, or any signals per se. However, the term "processor-readable storage medium" does encompass processor cache, Random Access Memory (RAM), register memory, and/or the like.

Computing device 200 also includes input interface 260, which may be configured to enable computing device 200 to receive input from users or from other devices. In addition, computing device 200 includes output interface 270, which may be configured to provide output from computing device 200. In one example, output interface 270 includes a frame buffer, graphics processor, graphics processor or accelerator, and is configured to render displays for presentation on a separate visual display device (such as a monitor, projector, virtual computing client computer, etc.). In another example, output interface 270 includes a visual display device and is configured to render and present displays for viewing.

In the illustrated example, computing device 200 is configured to communicate with other computing devices or entities via network adapter 280. Network adapter 280 may include a wired network adapter, e.g., an Ethernet adapter, a Token Ring adapter, or a Digital Subscriber Line (DSL) adapter. Network adapter 280 may also include a wireless network adapter, for example, a Wi-Fi adapter, a Bluetooth adapter, a ZigBee adapter, a Long Term Evolution (LTE) adapter, or a 5G adapter.

Although computing device 200 is illustrated with certain components configured in a particular arrangement, these components and arrangement are merely one example of a computing device in which the technology may be employed. In other examples, data storage memory 250, input interface 260, output interface 270, or network adapter 280 may be directly coupled to processing circuit 210, or be coupled to processing circuit 210 via an input/output controller, a bridge, or other interface circuitry. Other variations of the technology are possible.

Some examples of computing device 200 include at least one storage memory (e.g. data storage memory 250), at least one operating memory (e.g., operating memory 220) and at least one processor (e.g., processing unit 210) that are respectively adapted to store and execute processor-executable code that, in response to execution, enables computing device 200 to perform actions, such as, in some examples, the actions of process 490 of FIG. 4, as discussed in greater detail below.

Figure 3:
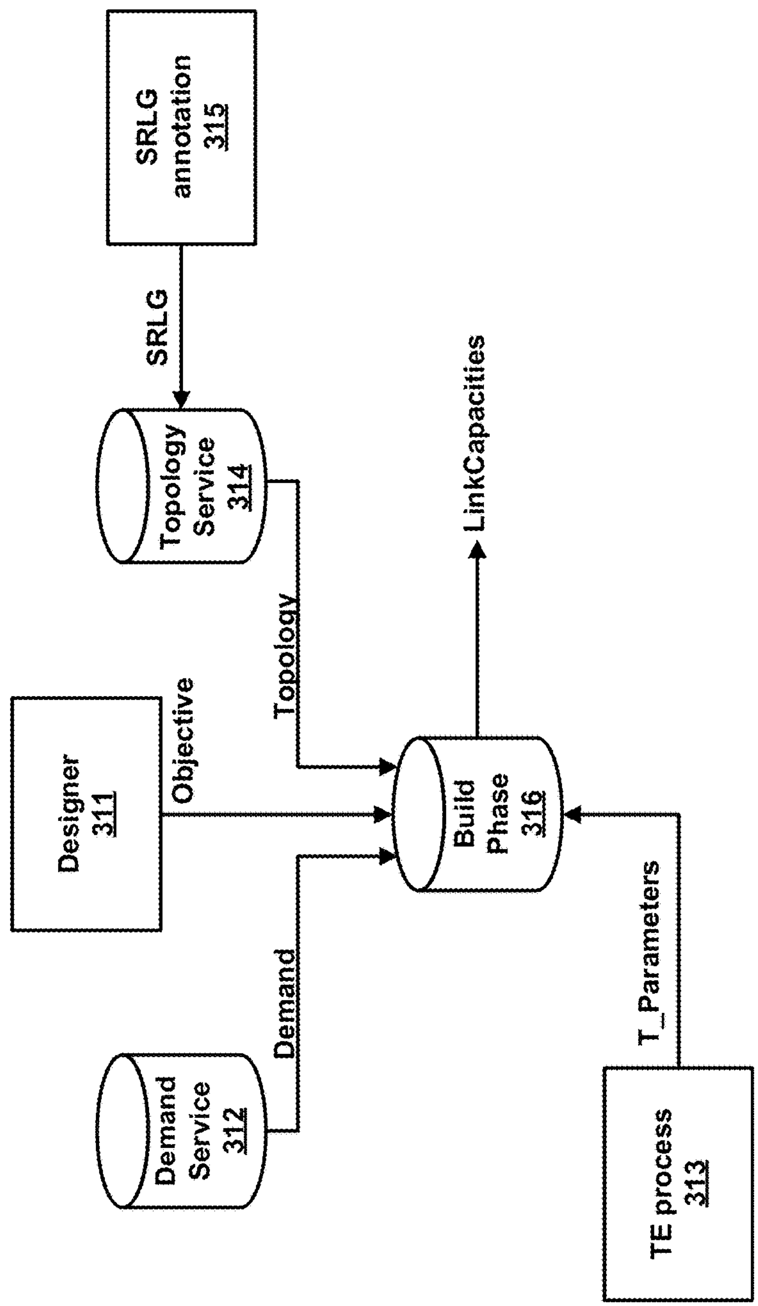
FIG. 3 is a block diagram illustrating an example of a system for cloud network updating.

FIG. 3 is a block diagram illustrating an example of a system (300) for cloud network updating. System 300 includes designer 311, demand service 312, traffic engineering (TE) process 313, topology service 314, shared risk link group (SRLG) annotation 315, and build phase 316.

Figure 4:
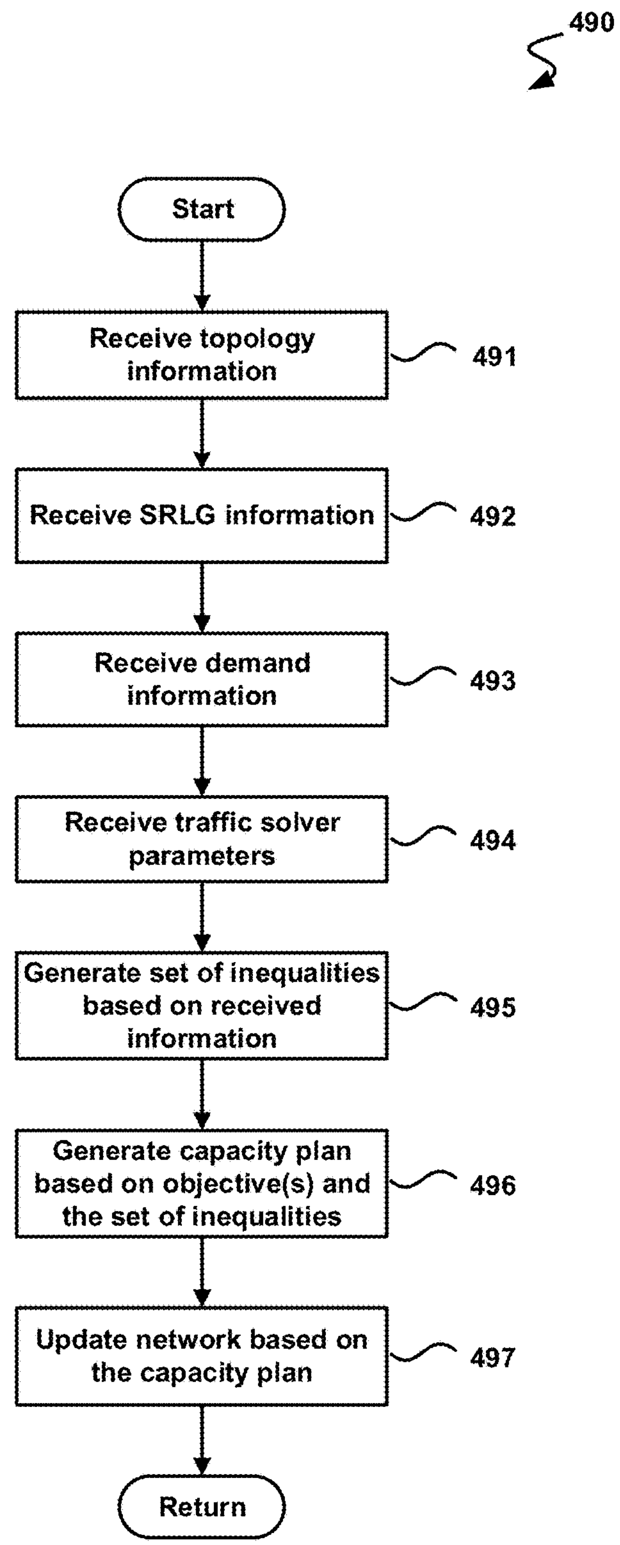
FIG. 4 is a logical flow diagram illustrating an example of a process for cloud network updating, in accordance with aspects of the present disclosure.

FIG. 3 will be further discussed in conjunction with FIG. 4.

Illustrative Process

For clarity, the processes described herein are described in terms of operations performed in particular sequences by particular devices or components of a system. However, it is noted that other processes are not limited to the stated sequences, devices, or components. For example, certain acts may be performed in different sequences, in parallel, omitted, or may be supplemented by additional acts or features, whether or not such sequences, parallelisms, acts, or features are described herein. Likewise, any of the technology described in this disclosure may be incorporated into the described processes or other processes, whether or not that technology is specifically described in conjunction with a process. The disclosed processes may also be performed on or by other devices, components, or systems, whether or not such devices, components, or systems are described herein. These processes may also be embodied in a variety of ways. For example, they may be embodied on an article of manufacture, e.g., as processor-readable instructions stored in a processor-readable storage medium or be performed as a processor-implemented process. As an alternate example, these processes may be encoded as processor-executable instructions and transmitted via a communications medium.

FIG. 4 is a logical flow diagram illustrating an example of process 490 for cloud network updating, in accordance with aspects of the present disclosure.

In some examples, process 490 is performed for growing a network. The network includes a plurality of links, with each link having a capacity. In some examples, the network is a global cloud network with links on a data-center-to-data-center scale. In some examples, the network is a software-defined network (SDN).

In some examples, process 490 may be used to optimize network design and network growth. Process 490 may be used to build a growing cloud network that is resilient to changes in the presence of dynamic changes in a network, such as outages and fluctuations, and to ensure performance and fault resilience under service level agreement (SLA) requirements, while reducing cost, such as the cost associated with the over-provisioning of links.

After a start block, the process proceeds to block 491. At block 491, network topology information is received. For instance, in some examples, build phase 316 receives topology information Topology from Topology Service 314.

In some examples, the topology information is or includes a directed graph that includes a representation of a set of physical routers and links comprising the network and the topology information for the physical routers and links encoded as the domains Node and Links. In some example, the topology information is a text file. In other examples, the topology information is another suitable format.

The process then moves to block 492. At block 492, shared risk link group information is received. In some examples, Topology Service 314 receives shared risk link group information SRLG from SRLG annotation 315, and Topology Service 314 in turn provides the SRLG information to build phase 316.

In some examples, the SRLG information includes a collection of shared risk groups associated with the physical network layout of the network. In one example, a shared risk link group is a group of links that may all fail at once if one link of the group of links fails. For example, a set of logical devices that have at least one physical device in common may all fail at once if the physical device is taken off-line. Such a set of logical devices therefore constitute a shared risk link group. Accordingly, in some examples, the shared risk link group information includes information about groups of logical links in the network in which each logical link in the group of logical links corresponds to the same physical link.

The process then advances to block 493. At block 493, demand information is received. The demand information is based on network bandwidth demand in the network. In some examples, the demand information Demand is received by Build Phase 316 from Demand Service 312. Demand Service 312 may include bandwidth brokers. In some examples, the demand information is a demand matrix for the network, where the demand matrix is the set of bandwidth demands for the network. In some examples, each demand of the demand matrix is defined as a source/destination pair node and a number indicating the amount of traffic requested for a flow.

In some examples, the demand information includes multiple traffic matrices of future forecasted traffic matrices. In some examples, the demand forecast is based in part on analytics and business needs. In some examples, the demand is defined as a worst-case or near worst-case scenario, such as peak traffic demand, or $95^{th}$ percentile peak traffic demand. In this way, during the build phase, the network design is done in accordance with traffic in worst-case or near-worst case scenarios so that the network is built to handle such traffic scenarios. In some example, the demand information is a text file. In other examples, the demand information is another suitable format. In some examples, as discussed above, the demand information includes future forecasts of bandwidth demand for the network.

The process then proceeds to block 494. At block 494, traffic solver parameters for the network are received. In some examples, traffic solver parameters T_Parameters are received by Build Phase 316 from Traffic Engineering (TE) process 313.

In some examples, one of the parameters is K, which represents the number of simultaneous link failures for which the network is designed to cope with. The parameter K may be one part of the SLA which the network should meet. That is, among other things, in some examples, process 490 ensures that the network can withstand K link failures. In some examples, K is two. In other examples, K is a positive integer other than two.

In some examples, there are two modes of providing inputs, such as the inputs provided in steps 491-494. In one mode, each input is provided to Build Phase 316 by a separate service, such as topology information Topology provided topology service 314 and demand information Demand provided by Demand service 313. In another mode, designer 311 designs future networks for future demands, and provides various inputs for Build Phase 316.

The process then moves to block 495. At block 495, a set of inequalities is generated based on the network topology information, the shared risk link group information, the demand information, and the traffic solver parameters. The set of inequalities is based upon a model of traffic routing that is based on selection of routes based on dynamic and global traffic engineering. The traffic engineering is global in that a centralized global process is used to find the best routes considering the entire global network. The traffic engineering is that dynamic in that it responds to dynamic changes in the network in real time.

In some examples, the set of inequalities include a link inequality for each link, and a path inequality for each path that can be taken by each demand.

In some examples, the following inequalities are used:

sf(d)<=d.demand for all d in DM u(l)<=l.capacity for all l in Links

0<=flow(p) for all p in Paths

In this example:

the flow function ‘flow: Paths–>Number’ takes a path and allocates a flow (a number).

Link={src: Node, dst: Node, capacity: Number}

A link has a source and destination node, and bandwidth capacity.

Paths=Link*

A path is a sequence of links such that the destination of the i'th link is the source of the i+1'st link.

Demand={src: Node, dst: Node, demand: Number}

DM=Demand Matrix=set of Demands for different source/destination pairs.

Solutions to flow(p) are used to define auxiliary measures sf(d) and u(l), where sf(d) is the sum of flows per demand, and u(l) is the link utilization for link I:

s(d):=Sum of flow(p) such that end-points of p.src=d.src, p.dst=d.dst u(l):=Sum of flow(p) such that p contains link l.

The process then advances to block 496. At block 496, a capacity plan is generated based on the set of inequalities and at least one objective. The capacity plan includes a target capacity for each link of the plurality of links in the network. In some examples, Build Phase 316 outputs the capacity plan as LinkCapacities.

In some examples, link capacity is defined as a step function of 100 gigabits per second. In other examples, the link capacity is quantified in other ways.

An explanation of the generation of the capacity plan is described in greater detail below. A summary explanation of the generation of the capacity plan is as follows.

In some examples, minimal cost is employed as the sole objective or as one of the objectives. More specifically, in some examples, a goal of network optimization for capacity planning is to find the minimal (cost) capacity improvement, that meets a set of demands under failure scenarios that may occur with non-negligible probability. In various examples, other objectives may include reducing latency, increasing reachability, and increasing availability.

In some examples, each failure scenario is looped over and the equations are solved for each failure scenario. In other examples, a robust optimization problem is set up that solves for all of the failures at once.

The network performs routing based on global controllers that perform routing based on dynamic traffic engineering and on a global basis. When building the capacity plan, the model of traffic engineering used in the global controllers is emulated so that traffic scenarios will be routed in a matter similar to the actual routing done in real time. Accordingly, building of the capacity plan is performed in conjunction with a global scheduler to determine where the flow will traverse on the network using dynamic traffic engineering and on a global basis under various fault and traffic scenarios. The generation of the capacity plan includes various fault scenarios, meaning a variety of scenarios involving outages and other disruptive network problems and network failures. The generation of the capacity plan includes various traffic scenarios, meaning variations in the quantity and location and type of traffic flow. In some examples, the modeling of the routing is based upon worst case aggregate demand.

In some examples, building the capacity plan includes incorporating fault models for networks using synthetic fault modeling with fault-diagnostic fault scenarios. In particular, in some examples, the fault modeling is based on probabilistic modeling and shared risk groups as well as incorporating temporal and stochastic network load models that cover sets of demand scenarios. Also, in some examples, the solution space is restricted to the solution space of software-defined networking controllers to the network optimizer. By restricting the solution space of the network optimizer to the space used by the dynamic controllers, the method is able to generate only solutions that are of use when the network operates in response to dynamic scenarios.

In some examples, generating the capacity plan includes performing a solution for network optimization based on the set of inequalities and the objective(s) based on failure models, utilization forecasts, and the solution space for dynamic traffic engineering. The set of paths preferred by the dynamic traffic engineering solutions is used as a starting point for network optimization under the sets of fault and demand scenarios used to generate the solution. In some examples, failure scenarios used for the generation of the capacity plan may be event log based on vendor scenarios, and the like.

Generation of the capacity plan uses principles of dynamic traffic engineering, but is different in that dynamic traffic engineering uses the traffic and demand parameters as they exist in real time. In contrast, generation of the capacity plan uses the same principles as in dynamic traffic engineering, but uses them over sets of faults and demand scenarios to determine the capacity required in each link under worst-case scenarios. However, because dynamic and global traffic engineering principles will be used in the actual traffic routing, overall link capacity needed will be less than if such principles were not used, and the generation of the capacity plan reflects scenarios that are worst case but based on dynamic and global traffic engineering, so that capacity is not needlessly added to meet SLAs.

For example, if K=2 (i.e., a network that is guaranteed to operate when there are two link failures), without using global engineering principles in the capacity planning, it would be necessary to have three times capacity on each and every path, so that if two paths go down, the third would take over. However, the global engineering approach takes into account all possible combinations of ways to get from a source to a destination, to provide end-to-end failover. The capacity planning takes this into account as well, and the proper necessary capacity for each link is calculated considering all possible combinations of ways to get from a source to a destination.

In some examples, generation of the capacity plan while modeling the dynamic traffic engineering solves includes using path-based network flow constraints that capture the solution space of dynamic traffic engineering solvers that at any time is provided with a set of preferred (shortest/cheapest) paths for each route. In some examples, the capacity plan generation also includes flow-preservation based constraint modeling, which restricts the set of routers instead of the set of paths in the solution space. Such constraints capture a potentially larger solution space of paths and are suitable to engineering networks over sets of traffic engineering solutions using long-term traffic engineering. In some examples, the capacity plan generation also includes techniques that produce feasible linear problems by approximating fault scenarios, and techniques that solve max/min objectives directly using general search techniques.

The primal/dual optimization theory can be expressed as a compact linear program, which takes into account the bandwidth broker capability to introduce flexibility into the traffic matrix. In some examples, greedy iterative procedural processes for optimization are used in this context, as well as approximation methods using linear-programming duality and a form of quantified constraint formulation is used that is amenable to optimal solving modulo quantifier reasoning and non-convex optimization. A greedy procedural process is a procedural process that makes the locally optimal choice at each stage in order to find a global optimum. In some examples, a symbolic optimization solver is used to handle combinations of linear inequalities over real numbers and either logical combinations of such inequalities or mixed integer linear programming inequalities.

In performing the solution for the capacity plan generation, network engineering constraints are formulated. In some examples, the first formulation of the network engineering constraints is based on a fault model under static rerouting. This scenario targets the immediate recovery of routing under abrupt network failures. In this case, rerouting is not instantaneous and the network relies on already available tunnels to recover from outages and meet SLAs. In some examples, the second formulation targets recovery scenarios that accommodate rerouting across a space of possible routes that can be dynamically configured.

The specific details of one example of generating the capacity plan based on the set of inequalities and the objective(S) is described as follows.

As previously discussed, the set of inequalities may be based on the following:

sf(d)<=d.demand for all d in DM u(l)<=l.capacity for all l in Links

0<=flow(p) for all p in Paths

An objective function for maximizing throughput is Sum sf(d) for d in DM. When a throughput is fixed, other objective functions can be formulated, such as minimizing maximal link utilizations and giving preference to solutions that distribute flow evenly. The set of links, their capacities, and latencies may be fixed in a given deployment.

In some examples, the capacity plan is generated based on determining the minimal (cost) capacity improvement, that meet a set of demands under failure scenarios that may occur with non-negligible probability.

For simplification of an example process, generation of a capacity plan involving single demand matrix DM is described in the next example.

With an objective to minimize a function delta : Link->Number and flow flow : Demand->Number, such that for every probable failure scenario fail : Link->Bool, the cost of increasing link capacity with amount delta is minimized. Schematically, in this example, the objective is:

```
min delta
    max fail
        min flow
            of Cost(delta):
                PATH-FLOW
                u(l) <= l.capacity + delta(l)    for all l in Links
                PossibleFailure(K, fail)
                if fail(l) then u(l) <= 0    for all l in Links
```

using the previously described constraints, which will be referred to as PATH-FLOW:

sf(d) =d.demand for all d in DM

0<=flow(p) for all p in Paths and where PossibleFailure(K, fail) constrains the failure scenarios that can be considered probable. For example, with K link failures, then PossibleFailure(K, fail) is defined as "(Sum of fail(l) for l in Link)<=K". If l1, l2, . . . , ln are the links belonging to a shared risk group, then the conjunction fail(l1) && fail(l2) && . . . && fail(ln) is added as a disjunction to PossibleFailure(K, fail).

In this example, the objective Cost(delta) is a function of the delta capacity. In some examples, the cost function is a linear function of delta that takes the cost of delta to be proportionate to the length of a link. Accordingly, Cost(delta):=Sum of length(*l*)*delta(*l*) for *l* in Links In some examples, Cost(delta) is a step function based on delta; with capacity added in discrete increments and for each increment the cost is increased by the same amount. Such costs may be expressed using mixed integer linear programming constraints. This formulation fixes a set of paths a priori and only considers flows through the fixed set of paths. This formulation is suitable for optimizing capacity planning in the presence of a TE solver that evenly distributes routes over a fixed set of paths Paths. Failure recovery over Paths does not immediately require intervention by the TE solver, as the capacity delta calculated by this objective is sufficient over the paths presented to the TE solver.

Alternatively, in some examples, network flow preservation is enforced on each node. In this formulation it is convenient to fix a subset of relevant nodes for each demand. The set of relevant nodes for a given demand can be taken as the set of nodes on the shortest paths (up to a threshold length) between the end-points of a demand. The relevant nodes are referred to herein using the function relevant: Demand–>Node-set. In this examples, instead of solving for flows a utilization function util:Demand x Link–>Number is solved. Accordingly, to solve this problem according to one example, first, the flow constraints are defined as follows.

u(l):=Sum of util(d,l) for d in DM, for all l in Links

0<=util(d,l) for all l in Links, d in DM u(l)<=l.capacity+delta(l) for all l in Links inflow(d,n)+Sum of util(d,l) for l in Links such that l.src=n =outflow(d,n)+Sum of util(d,l) for l in Links such that l.dst=n for all d in DM, n in relevant(d)

where inflow(d,n):=if d.src=n then d.demand else 0 outflow(d,n):=if d.dst=n then d.demand else 0

These flow constraints are referred to herein as NODE-FLOW. Accordingly, the capacity planning problem under K failures may be defined as:

```
min delta
    max fail
        min util
        of Cost(delta) :
            NODE-FLOW
            u(l) <= l.capacity + delta(l)    for all l in Links
            PossibleFailure(K, fail)
            if fail(l) then u(l) <= 0    for all l in Links
```

In the following, FLOW refers to either NODE-FLOW or PATH-FLOW, and FLOW-SCENARIOS refers to:

```
FLOW
u(l) <= l.capacity + delta(l)    for all l in Links
PossibleFailure(K, fail)
if fail(l) then u(l) <= 0    for all l in Links
```

A greedy approximation procedural process may be obtained by enumerating each failure scenario that satisfies PossibleFailure (K, fail) and incrementing the value of delta with the minimal amount in each round. In some examples, this greedy approach requires a number of optimization constraint solving calls as the number of different solutions to PossibleFailure(K, fail) and generally computes an over-approximation of delta. In some examples, semantically, the greedy over-approximation operates as follows:

```
delta0(l) := 0    for all l in Links
for each scenario fail, s.t. PossibleFailure(K, fail):
    minimize Cost(delta) :
        FLOW-SCENARIOS
        delta0(l) <= delta(l)          for all l in Links
    delta0(l) := delta(l) for all l in Links
```

Linear inequality systems, and generally many convex optimization problems over real numbers may entail strong duality of linear programming. Convex optimization generally refers to the optimization of convex functions over convex sets. For example, an inner-most maximization objective may be replaced by a minimization objective after rewriting inequalities. In this context, failure scenarios generally cause the optimization problem to be non-convex so that strong duality does not hold, and an approximation may be obtained (e.g., the minimal solution may be greater than or equal to the maximal solution of the dual system). Also, after dualizing inequalities subject to a subset of variables, a non-linear system may be obtained.

The problem may be directly solved optimally by computing in stages increases of the flow in each subsequent scenario.

In some examples, a solution to the optimality problem can be described as a flat optimization criterion modulo quantified constraints. For instance:

```
min Cost(delta)
    forall fail :
        exists flow:
            if PossibleFailure(K, fail) then
                FLOW,
                u(l) <= l.capacity + delta(l) for all l in Links
                if fail(l) then u(l) <= 0    for all l in Links
```

or alternatively:

```
min delta, flow, fail
  of Cost(delta) :
      FLOW-SCENARIOS(delta, flow, fail)
      for all fail', delta', flow' :
          if FLOW-SCENARIOS(delta', flow', fail') and Cost(delta')
          > Cost(delta) then
              exists flow'' : FLOW-SCENARIOS(delta, flow'', fail')
```

Either formulation may be solved using quantifier elimination followed by non-convex optimization on the resulting quantifier-free constraints. In some examples, a method that interleaves optimization and quantifier elimination may be used to solve either formulation.

In some examples, network optimization in the face of distributions of demands, or multiple demands, DM1, DM2, . . . , has associated objective:

```
min delta
    max fault, demand DM in DM1, DM2, ...
        min flow
            of Cost(delta):
                FLOW-SCENARIOS(delta, flow, fail)
  where DM is implicit in FLOW-SCENARIOS.
```

The capacity plan is generated based on set of inequalities and one or more objectives using one or more of the methods described above.

The process then proceeds to block 497. At block 497, the network is updated based on the capacity plan. The network is updated such that each link of the plurality of links in the network has an updated capacity that corresponds to the target capacity. The capacity of at least one of the links of the plurality of links in the network is increased based on the capacity plan.

The capacity plan defines the capacity that each link should have when the network is updated. In some examples, because the network already exists, the capacity for each link defined in the capacity plan will be equal to or greater than the current capacity of the link, because when the network is updated, each link will either be left as it is or capacity will be added to the link.

The process then moves to a return block, where other processing is resumed.

In some examples, after the network is updated, the process will be iterated again, this time based on the updated network. In this way, the network will continue to grow over time.

In some examples, process 490 optimizes the layout of the physical network with respect to costs and performance guarantees, and process 490 applies to configuring network routing that is resilient to the presence of dynamic changes in a network, such as outages and fluctuations in demands. The network is dynamically optimized using traffic engineering tools that select routes based on global optimization constraints. By exposing the optimization objectives to the network design layer, process 490 tunes the layout of networks for performance and utilization, guides network provisioning, and ensures cost and performance guarantees including K and service level agreements (SLAs), using, among other things, received information about the physical constraints. SLAs require sustained performance of the key metrics under conditions of K failures. Use of process 490 to update the network may save hundreds of millions of dollars relative to other technologies while providing the same level of performance including K and service level agreements by avoiding unnecessary over-provisioning of links.

After the network is updated, the network operates in real time, with traffic routing performed by global controllers on a global basis and performed dynamically.

The capacity planning and traffic engineering is accordingly performed as a two-phase process. The first phase is the capacity planning, which is performed offline to generate the capacity plan. The capacity planning phase is performed relatively infrequently, such as every few days. The second phase is online and comprises of changing traffic splits across tunnels in response to changes in traffic demands, failures, and the like. The capacity of each link is fixed to the actual capacity of the link during the online phase, whereas the capacities are variable (but are, at minimum, the actual capacity) in the offline phase. During the first phase, the demand is forecast demand, wherein in the second phase, the demand is actual demand, or prediction of demand over the next 15 minutes, or the like.

The online phase may be done relatively frequently and is computationally cheap (e.g., a simple linear program), but the flexibility may be limited by the number of tunnels, and may be limited to moving traffic across tunnels. Since the flexibility in the of the online phase may be limited, in some examples, the precomputation of tunnels needs to be done carefully in a manner that considers different failure and traffic demand scenarios. In this way, in some examples, the precomputing of tunnels is robust to traffic demands, while factoring in the (limited flexibility) in adjusting traffic online in response to a given traffic matrix of new demands.

The offline phase may use n time windows, over, for instance, 18 or 20 or 24 months. In one example, each time the build plan is used, 24 snapshots of the future network are generated, one for one month in the future, another for the two months in the future, and so on, so that the $24^{th}$ snapshot is 24 months in the future. The snapshots are updated each month based on the actual month as it was updated based on the previous snapshot for each month. As the future view becomes present, the view is fed into the next, and the offline phase moves into the next set of months, which creates a kind of feedback loop of future views becoming the present network, as a rolling process.

The offline phase includes a process for validating the files for each of the n time windows. In some examples, each capacity plan file is validated by running simulations of actual traffic engineering on each capacity plan file to validate the capacity plan file, so that multiple layers of validation are provided. In this way, in some examples, a plurality of capacity plans is generated including the capacity plan, such that each capacity plan of the plurality of capacity plans corresponds to a different future date. In some of these examples, the network is updated when each future date becomes the present date over time and a new plurality of capacity plans is generated each time the network is updated based on the updated network as a rolling process of updating the network.

Although various examples discuss the use of process 490 to update a network, process 490 may also be used in the initial build of the network, in which case the minimum capacity of each link is one since there are currently no actual links.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

We claim:

1. A method for computer network design, comprising:

receiving network topology information that is based on a topology of a network, wherein the network includes a plurality of links, and wherein links of the plurality of links have capacities associated therewith;

receiving shared risk link group information based on shared risk link groups in the network;

receiving demand information based on network demand in the network;

receiving traffic solver parameters for the network;

generating a set of inequalities based on the network topology information, the shared risk link group information, the demand information, and the traffic solver parameters, wherein the set of inequalities is based upon a dynamic and global traffic engineering model of traffic routing;

generating a plurality of capacity plans including a capacity plan, such that the ft capacity plan based on the set of inequalities and at least one objective, and such that the capacity plans of the plurality of capacity plans correspond to different future dates, wherein the capacity plan includes corresponding target capacities for corresponding links of the plurality of links in the network; and updating the network based on the capacity plan such that the links of the plurality of links in the network have updated capacities that correspond to the target capacities, and such that the capacity of at least one of the links of the plurality of links in the network is increased based on the capacity plan.

2. The method of claim 1, further comprising validating the capacity plan by running a simulation based on the capacity plan.

3. The method of claim 1, wherein the shared risk link group information includes information about groups of logical links in the network in which multiple logical links in the group of logical links corresponds to a same physical link.

4. The method of claim 1, wherein the demand information includes future forecasts of bandwidth demand for the network.

5. The method of claim 1, wherein the topology information includes a directed graph that includes a representation of a set of physical routers and links comprising the network.

6. The method of claim 1, wherein the objective includes a cost reduction.

7. The method of claim 1, further comprising updating the network upon a future date becoming the present date and generating a new plurality of capacity plans upon the network being updated.

8. A processor-readable storage medium, having stored thereon process-executable code, that, upon execution by at least one processor, enables actions, comprising:

generating a set of inequalities based on network topology information, shared risk link group information, demand information, and traffic solver parameters, wherein the network topology information is based on a topology of a network, the network includes a plurality of links, the shared risk link group information based on shared risk link groups in the network, the demand information is based on network demand in the network, links of the plurality of links have corresponding capacities, and wherein the set of inequalities is based upon a dynamic global traffic engineering model of traffic routing;

generating a plurality of capacity plans including a capacity plan, such that the capacity plan based on the set of inequalities and at least one objective, and such that the capacity plans of the plurality of capacity plans correspond to different future dates, wherein the capacity plan includes corresponding target capacities for corresponding links of the plurality of links in the network; and generating an updated capacity plan based on updated network topology information, updated shared risk link group information, updated demand information, and updated traffic solver parameters, wherein the updated network is the network after the network is updated based on the capacity plan such that corresponding links of the plurality of links in the network have updated capacities that corresponds to the corresponding target capacities such that at least the capacity of at least one of the links of the plurality of links in the network is increased based on the capacity plan.

9. The processor-readable storage medium of claim 8, the actions further comprising validating the capacity plan by running a simulation based on the capacity plan.

10. The processor-readable storage medium of claim 8, wherein the shared risk link group information includes information about groups of logical links in the network in which multiple logical links in the group of logical links correspond to a same physical link.

11. The processor-readable storage medium of claim 8, wherein the demand information includes future forecasts of bandwidth demand for the network.

12. The processor-readable storage medium of claim 8, wherein the topology information includes a directed graph that includes a representation of a set of physical routers and links comprising the network.

13. A system for computer network design, comprising: an operating memory adapted to store run-time data for the computing device; and at least one storage memory and at least one processor that are respectively adapted to store and execute processor-executable code that, in response to execution, enables the computing device to perform actions, including:

generating a set of inequalities based on network topology information, shared risk link group information, demand information, and traffic solver parameters, wherein the network topology information is based on a topology of a network, the network includes a plurality of links, the shared risk link group information based on shared risk link groups in the network, the demand information is based on network demand in the network, links of the plurality of links have corresponding capacities, and wherein the set of inequalities is based upon a model of traffic routing that is based on selection of routes based on dynamic and global traffic engineering;

generating a plurality of capacity plans including a capacity plan, such that the capacity plan based on the set of inequalities and at least one objective, and such that the capacity plans of the plurality of capacity plans correspond to different future dates, wherein the capacity plan includes corresponding target capacities for corresponding links of the plurality of links in the network; and generating an updated capacity plan based on the set of inequalities, wherein the updated capacity plan includes a target capacity for each link of the plurality of links in the updated network.

14. The system of claim 13, the actions further including generating an updated set of inequalities based on updated network topology information, updated shared risk link group information, updated demand information, and updated traffic solver parameters, wherein the updated network is the network after the network is updated based on the capacity plan such that corresponding links of the plurality of links in the network have updated capacities that corresponds to the corresponding target capacities such that at least the capacity of at least one of the links of the plurality of links in the network is increased based on the capacity plan, and wherein the updated capacity plan is based on the updated set of inequalities.

15. The system of claim 13, the actions further including validating the capacity plan by running a simulation based on the capacity plan.

16. The system of claim 13, wherein the shared risk link group information includes information about groups of logical links in the network in which each logical link in the group of logical links corresponds to a same physical link.

17. The system of claim 13, wherein the demand information includes future forecasts of bandwidth demand for the network.

18. The system of claim 13, wherein the topology information includes a directed graph that includes a representation of a set of physical routers and links comprising the network.

19. The system of claim 13, wherein the objective includes a cost reduction.

20. The system of claim 13, the actions further including updating the network upon a future date becoming the present date and generating a new plurality of capacity plans upon the network being updated.

* * * * *